(No Model.) 2 Sheets—Sheet 2.

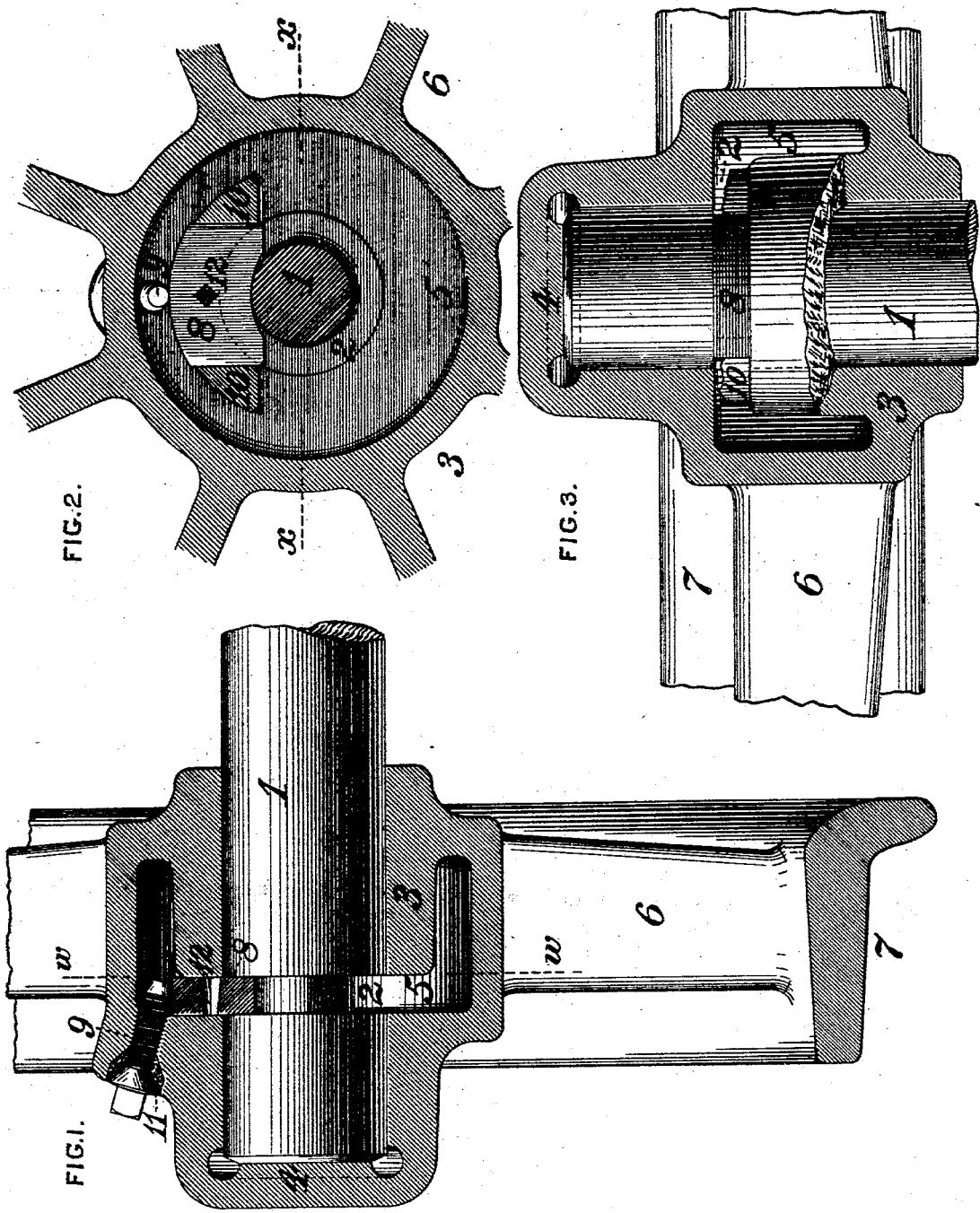

L. R. FAUGHT.
CAR WHEEL.

No. 321,590. Patented July 7, 1885.

WITNESSES:
R. H. Whittlesey
C. M. Clarke

INVENTOR
L. R. Faught
BY J. Snowden Bell.
ATTORNEY.

UNITED STATES PATENT OFFICE.

LUTHER R. FAUGHT, OF PHILADELPHIA, PENNSYLVANIA.

CAR-WHEEL.

SPECIFICATION forming part of Letters Patent No. 321,590, dated July 7, 1885.

Application filed April 13, 1885. (No model.)

*To all whom it may concern:*

Be it known that I, LUTHER R. FAUGHT, of the city and county of Philadelphia, in the State of Pennsylvania, have invented certain new and useful Improvements in Car-Wheels, of which improvements the following is a specification.

My invention relates to car-wheels which are mounted upon their axles with the capacity of rotation independently thereof, wheels of such type, which are ordinarily known as "loose wheels," being largely used in mining-cars, as well as in other branches of railroad service.

The object of my invention is to provide simple, effective, and inexpensive means for maintaining a loose wheel in normal position longitudinally upon its axle, and for enabling proper lubrication of the bearing-surfaces of the wheel and axle to be desirably and conveniently effected.

To these ends my invention, generally stated, consists in the combination of an axle having an annular groove adjacent to its end, a wheel mounted freely on said axle, a key-block fitting in a recess between guides or stops within the hub of the wheel and engaging the groove of the axle, and a locking screw or pin serving to hold the key-block in position. The improvements claimed are hereinafter more fully set forth.

Figure 5:
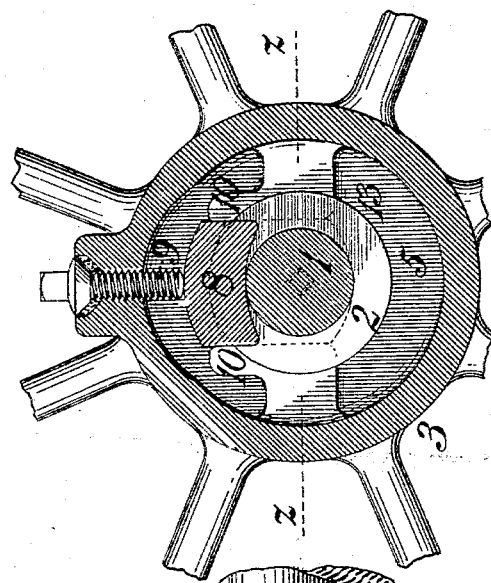
Figure 6:
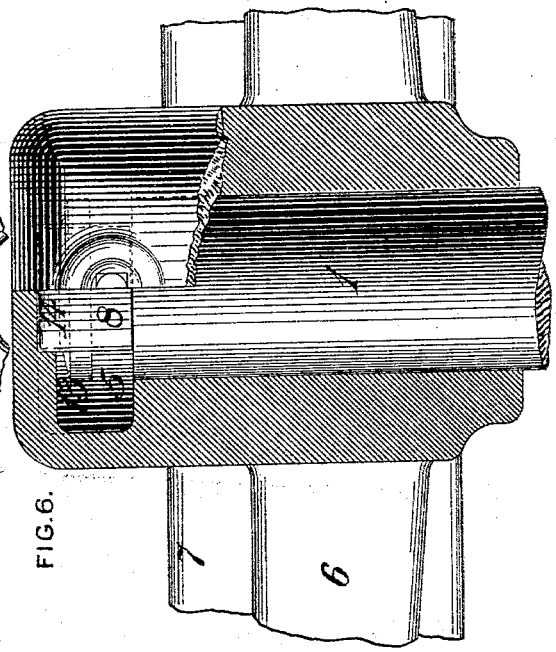
Figure 7:
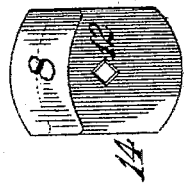
Figure 4:
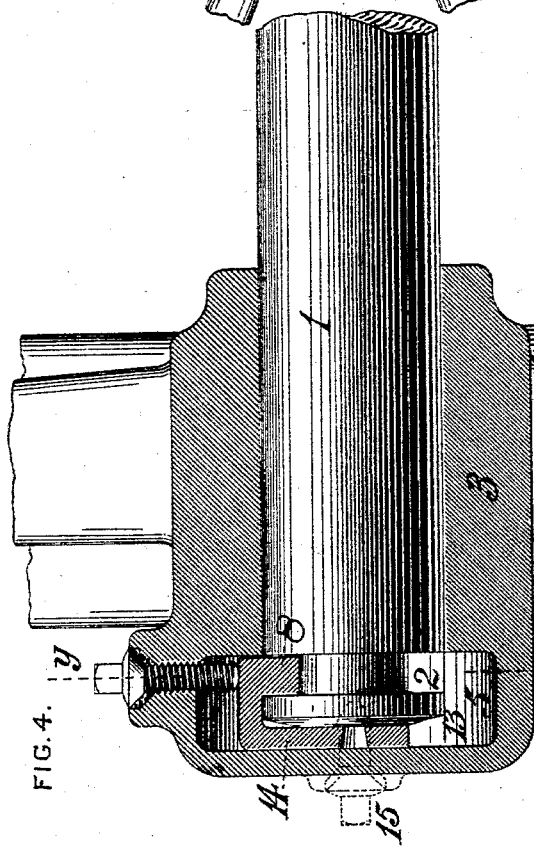
Figure 8:
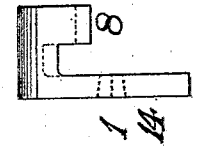

In the accompanying drawings, Figure 1 is an axial section through a car-wheel, with the axle thereof in elevation, illustrating the application of my invention; Fig. 2, a transverse section through the same at the line *w w* of Fig. 1, looking toward the end of the axle; Fig. 3, a longitudinal section, partly in elevation, at the line *x x* of Fig. 2; Fig. 4, an axial section through a car-wheel, with the axle in section, illustrating a modified form of my invention; Fig. 5, a transverse section through the same at the line *y y* of Fig. 4, looking toward the end of the axle; Fig. 6, a longitudinal section, partly in elevation, at the line *z z* of Fig. 5; Fig. 7, a face view of the key-block of Figs. 4 and 5 and 6, and Fig. 8 a longitudinal central section through the same.

As ordinarily constructed, loose wheels have been held as against lateral or longitudinal movement on their axles by means of collars and linchpins, the latter being passed transversely through the axle on the outer ends of the wheels, and the former being formed upon the axle and bearing against the inner ends of the hubs. To prevent abrasion and undue wear of the working-surfaces, it is necessary that the same should be supplied with oil or other lubricating material, for the reception of which chambers or receptacles have been formed upon or connected to the wheels, from which chambers, through the movements of the wheel when in operation, the lubricant may be supplied to the parts as required.

The employment of collars and linchpins is objectionable by reason of involving greater expense in the construction of axles, increased friction upon the comparatively large diameter of the collar and hub in contact therewith, the complete exposure of the bearing-surfaces of the collar and hub to dust and grit, and the difficulty of effecting proper lubrication of the same. The axle and wheel being liable to pass through muddy water when in service, the oil is readily washed away and a deposit of grit left in its stead, and the open outer ends of the wheels permit the escape and waste of oil.

The objections above recited are substantially obviated by my invention, in which collars and linchpins are wholly dispensed with and the outer end of the hub entirely closed. The thrust of the wheel is sustained against the end of the axle with a corresponding reduction of friction, and the construction, which is simple and inexpensive, is adaptable to use without changes in or additions to the other portions of the structure ordinarily used.

In the practice of my invention the wheels are mounted and rotate freely upon a plain cylindrical axle, 1, which is devoid of the usual raised collars, and has an annular groove or recess, 2, formed peripherally upon it adjacent to each of its ends. The hub 3 of the wheel is bored out to fit freely on the axle, and is preferably closed entirely at its outer end, forming thereat, on its inner side, a transverse bearing-surface, 4, which abuts against the end of the axle. An oil chamber or reservoir, 5, is formed within the hub 3, communicating with the central bore thereof, and is adapted to be supplied with lubricant through an opening, which is closed by a suitable removable plug, which may either be the locking-screw presently to be described, or a plug specially provided for the purpose. The arms 6 and rim 7 of the wheel are of the usual construction.

The wheel is maintained in normal position longitudinally upon the axle and its lateral movement thereon prevented by a key-block, 8, which fits within the groove 2 of the axle, and within a recess or socket of corresponding width formed in the hub 3 of the wheel, in line with the groove 2, said key-block, which has its inner face curved to fit over the reduced diameter of the axle within the groove, with only a narrow bearing thereon, being retained in position in the groove and recess by a locking screw or pin, 9, passing through an opening in the hub and bearing against the outer face of the key-block. Lateral displacement of the key-block is prevented by guides or stops 10, formed by portions of the metal of the hub located in line with the groove 2 of the axle, and constituting the side walls of the recess in which the key-block rests; and its vertical displacement and disengagement from the groove, which would otherwise be occasioned by gravity in the revolution of the wheel, are prevented by the locking-screw 9. The latter, in the instance shown, performs the additional function of a plug for closing an opening for the supply of oil to the chamber 5, the location of the chamber being such as to enable a separate oil-plug to be dispensed with, but with a differently-located oil-chamber—as, for example, one placed between the arms of the wheel—would be used only to maintain the key-block in operative position. A suitable packer, 11, which is compressed between a tapering shoulder on the locking-screw and a corresponding recess in the hub, prevents any leakage of oil from the chamber 5 when the locking-screw passes or stands in its lowest position, and the chamber may be supplied with oil by removing said screw when the same stands in its highest position, inasmuch as in such case the key-block, being above the center of the axle, cannot be displaced from the groove thereof by the action of gravity.

It will be seen that by the above construction the wheel and axle, while free to rotate independently, are effectually locked together, as against lateral movement relatively one to the other, by the engagement of the key-block with the axle-groove and hub-recess. Convenient and desirable facilities for the storage of lubricant and its supply to the working-surfaces are likewise provided, and access of dust and grit to the outer end of the axle or waste of oil thereat is completely obviated. The connection of the wheel and axle is effected by first inserting the end of a rod into a squared opening, 12, in the key-block, passing the latter down the bore of the hub, and slipping it laterally into its socket, this operation being of course performed prior to placing the wheel upon the axle. The wheel is then slipped upon the axle, with the key-block recess and key-block below the center, the gravity of the block causing it to fall to the outer extremity of its recess, which is of sufficient depth to enable the key-block to stand entirely clear of the bore of the hub, and the wheel to be moved longitudinally upon the axle until the bearing-surface 4 of the hub abuts against the end of the axle. The key-block recess will then be in line with the axle-groove 2, and by turning the wheel until said recess is above the axle the key-block will drop by gravity into the groove 2, in which it is fixed, as before stated, by the locking-screw 9. The wheel may be oiled from time to time, as required, by removing the locking-screw when the latter stands above the axle; and it will be seen that the detachment of the wheel and axle may be effected by removing the locking-screw, turning the wheel until the key-block drops clear of the axle-groove, and then slipping the wheel off the axle. It will be obvious, further, that while my improvements obviate the necessity of employing axle-collars, they may be applied with equal facility to axles which are provided with such collars when necessary or desirable so to do.

In the modification illustrated in Figs. 4 to 8, inclusive, the annular groove 2 is located as closely as practicable to the end of the axle, being separated therefrom only by a narrow flange, 13. The key-block fits, as before, in the axle-groove 2, and is extended over the flange 13 to form an end bearing-plate, 14, which fits between the end of the axle and the bearing-surface 4 of the hub 3. The guides or stops 10, which prevent lateral displacement of the key-block, are in this case located in the end of the hub and fit against the sides of the end bearing-plate, 14, and the key-block may be maintained in engagement with the axle-groove either by a locking screw or pin, 9, bearing against its outer face in a substantially similar manner to that before described, or by a locking-screw, 15, passing axially through the outer end of the hub and engaging the bearing-plate 14, as indicated in dotted lines in Fig. 4.

The attachment, oiling, and detachment of the wheel and axle are effected as hereinbefore described, and the construction admits of the axle-groove being formed of greater depth than that first described, so as to give increased shoulder or bearing for the engagement of the key-block, with decreased liability to breakage of the axle by reason of the comparative closeness of the groove to its end. As in the former instance, an oil chamber or reservoir, 5, of any desired form and location may be employed.

I am aware that a pin or plate fitting an annular groove in an axle and serving to prevent longitudinal movement of a wheel thereon has been heretofore known, and such device therefore, broadly, I disclaim. So far, however, as my knowledge and information extend, in all prior instances of its use the constructions have been such as to involve the necessity of its insertion from the outer end of the hub either by the provision of a removable cap thereat or the projection of separate sections of the pin through the metal of the hub to the outside thereof. Under my invention I am enabled to employ a closed-ended hub without any perforation other than that which is tightly closed by the locking-pin, and, in addition to effecting a reduction in the number of parts and cost of fitting, attain a material advantage relatively to prior constructions in point of perfecting lubrication, and preventing waste of oil and access of dust and grit to the axle.

I claim as my invention and desire to secure by Letters Patent—

1. The combination of an axle having an annular groove, a wheel mounted freely on said axle, a key-block capable of being entered through the axle-opening of the inner end of the hub and fitting in an outwardly-closed recess between guides or stops formed wholly within the body of the hub, said key-block engaging the groove of the axle, and a locking screw or pin passing through the hub and bearing upon the key-block, substantially as set forth.

2. The combination of an axle having an annular groove, a wheel having a hub closed at its outer end and mounted freely on the axle, guides or stops formed within said hub and adapted to retain a key-block in position longitudinally therein, a key-block capable of being entered through the open inner end of the hub and fitting in a recess between said guides or stops, said key-block engaging the groove of the axle, and a locking screw or pin passing through the hub and bearing upon the key-block, substantially as set forth.

3. The combination of an axle having an annular groove, a wheel having a hub closed at its outer end and mounted freely on the axle, guides or stops formed within the hub, a key-block capable of being entered through the open inner end of the hub and fitting in a recess between said guides or stops, said key-block engaging the groove of the axle, a bearing-plate fixed upon the key-block and interposed between the end of the axle and the inner face of the hub, and a locking screw or pin passing through the hub and retaining the key-block in position between the guides, substantially as set forth.

LUTHER R. FAUGHT.

Witnesses:
CHAS. E. PANCOAST,
R. M. COLLINS, Jr.